J. R. RUDE.
Corn Planter.
No. 61,765. Patented Feb. 5, 1867.
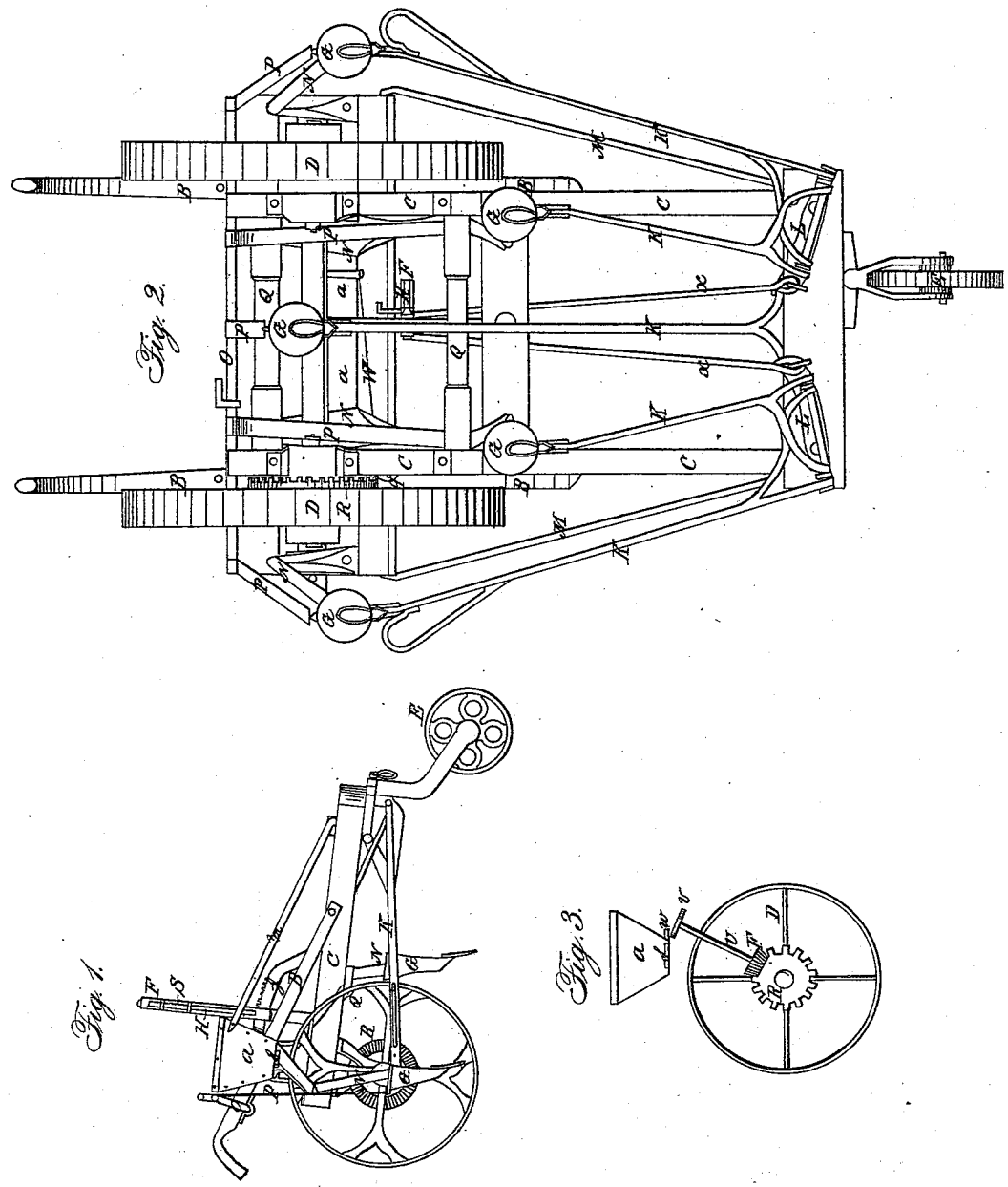
Witnesses:
F. Lehman
Robt E Lee
Inventor:
J R Rude
per
J H Alexander
atty

United States Patent Office.

J. R. RUDE, OF LIBERTY, INDIANA.

Letters Patent No. 61,765, dated February 5, 1867.

IMPROVEMENT IN GRAIN DRILLS.

*The Schedule referred to in these Letters Patent and making part of the same.*

TO ALL WHOM IT MAY CONCERN:

Be it known that I, J. R. RUDE, of the town of Liberty, and State of Indiana, have invented certain new and useful Improvements in Grain Drills; and I declare the following to be a full, true, and exact description of the same, reference being had to the accompanying drawings, which form a part of these specifications, and to the letters of reference marked thereon.

Figure 1 represents a side view of my grain drill.

Figure 2 represents an inverted view of the same.

Figure 3 shows the manner in which the slide in the grain-box is worked when the drill is in motion.

Letter A represents the box into which the grain is placed for the purpose of being drilled into the ground, and is so constructed as to extend over the wheels D D. Letter B represents the handles of the drill, which pass through the seed-box for the purpose of giving it greater strength and stability, and are joined to the frame C. Letter C represents the frame of the drill, which is supported in the rear by the two wheels D D, and in the front by the caster or guide-wheel E, and upon which the seed-box is supported. Letter F represents the upright bar or lever, by which the boots G G G G G are expanded or contracted, as the case may require, while drilling amongst standing corn. To the side of the lever F is attached a similar but smaller lever, H, which is provided with the spring I, for the purpose of forcing the smaller lever H to press down and catch in the notches or teeth of the bar J, so as to prevent the lever F from slipping from side to side. The letter K represents the bars or rods that are attached to the boots G G G G G for the purpose of drawing them through the earth, so as to make furrows for the grain, and are secured to the plates L L on the front part of the drill. These bars or rods are used in connection with the lever F, and are also used for the purpose of steadying the boots and keeping them at the required distance apart. Letters M M represent two rods that are fastened to the side of seed-box and frame for the purpose of bracing and giving strength to the whole drill. Letter E represents the caster or guiding-wheel, which is placed at the front of drill for the purpose of both supporting and guiding the drill while in motion. Letters G G G G G represent the boots by which the grain is drilled into the ground at the required distance apart. Each boot is furnished with a hoe for the purpose of breaking the earth, so as to make furrows for the grain. The letters N N N N represent the tubes by which the grain is conducted from the grain-box to the boots, from which they pass into the earth. Letter O represents the rod or bar by which the boots G, &c., are raised from the ground by means of the straps P P P P P. The said bar or rod O is fastened to the handles B B, back of the seed-box A, and can be lowered or raised at pleasure. Letters Q Q represent two rollers, which are attached to the frame C for the purpose of supporting the straps P P P in their passage from the rod O to the boots G G G, and to render it easier to raise or lower the boots. Letter R represents a small cog-wheel, which is connected to the large wheel D, and is used for the purpose of working the slide S in the bottom of the seed-box A. Against the cog-wheel R is placed the second cog-wheel, T, which is provided with the upright-bar U. At the top of the bar U is placed the perforated plate V, which is connected with the slide S by the rod W. When the drill is in motion, it causes the cog-wheels to revolve, and as the slide is joined to them it is thus worked backwards and forwards so as to regulate the flow of grain, through the apertures in the box A, into the boots. Letters L L represent two movable plates, which are pivoted to the front part of the frame C, and to which the rods K K K K are fastened. To the plates are fastened the two rods X X, which co-operate with the lever F. When the latter is worked the plates L L are moved either forward or backward, thus expanding or contracting the boots.

The advantages of my drill are as follows, viz: The boots can be expanded or contracted with perfect ease, enabling a person to plant his grain at any distance apart, and when not needed for ploughing can be raised entirely from the earth. The drill, from having a limber wheel, is much more easily managed than any other.

Having thus described my invention, what I claim, and desire to secure by Letters Patent, is—

1. The combination of the movable plates L L, the levers F, the rods X X, the toothed bar J, the levers F and H, and the spring I, the whole constructed, arranged, and operating in the manner herein specified.

2. The lever O, the straps P P P P P, the rollers Q Q, in combination with the drills G G G G G, when constructed in the manner and for the purpose herein specified.

3. I claim the seed-box A, when constructed so as to extend over the wheels D D, in combination with the tubes N N, the levers F, H, and O, and the drill-rods K K, for the purpose of feeding over wheels, when constructed in the manner and for the purpose as herein specified.

In testimony that I claim the foregoing as my own, I hereby affix my signature in the presence of two witnesses.

J. R. RUDE.

Witnesses:
 THOMAS PIERCE,
 A. WILSON.